United States Patent [19]
Dos Santos Pato et al.

[11] Patent Number: 6,044,953
[45] Date of Patent: *Apr. 4, 2000

[54] INDEPENDENT DEVICE FOR VERIFYING, VALIDATING AND CODIFYING INDUCTIVE CARDS

[75] Inventors: Manuel Augusto Miranda Dos Santos Pato; Antenor Capeli, Jr., both of Campinas; Marcos Aurélio Pegoreti, Indaiatuba, all of Brazil

[73] Assignee: Telecommunicações Brasileiras S/A-Telebras, Campinas, Brazil

[ * ] Notice: This patent issued on a continued prosecution application filed under 37 CFR 1.53(d), and is subject to the twenty year patent term provisions of 35 U.S.C. 154(a)(2).

[21] Appl. No.: 09/048,005

[22] Filed: Mar. 26, 1998

Related U.S. Application Data

[62] Division of application No. 08/696,826, filed as application No. PCT/BR95/00022, Mar. 15, 1995, abandoned.

[30] Foreign Application Priority Data

Mar. 16, 1994 [BR] Brazil ....................................... 9400749

[51] Int. Cl.$^7$ ....................................... G07F 7/08
[52] U.S. Cl. ........................... 194/209; 235/439
[58] Field of Search ..................... 194/208, 209, 194/210; 235/492, 493, 439

[56] References Cited

U.S. PATENT DOCUMENTS

| | | | |
|---|---|---|---|
| 3,204,741 | 9/1965 | Maxwell et al. | 194/208 |
| 3,885,130 | 5/1975 | Moulton et al. | 221/2 X |
| 4,029,945 | 6/1977 | Yamada et al. | |
| 4,231,458 | 11/1980 | Limone et al. | 194/208 X |
| 4,373,158 | 2/1983 | Orloff | 235/492 X |

FOREIGN PATENT DOCUMENTS

| | | | |
|---|---|---|---|
| 9203968 | of 0000 | Brazil . | |
| 9204434 | of 0000 | Brazil . | |
| 9300949 | of 0000 | Brazil . | |
| 297 28 | 12/1988 | European Pat. Off. | 194/208 |
| 2659 68 | 9/1991 | France . | |
| 9500003 PCT/BR | of 0000 | WIPO . | |
| 9500004 PCT/BR | of 0000 | WIPO . | |
| 9500028 | of 0000 | WIPO . | |

*Primary Examiner*—F. J. Bartuska
*Attorney, Agent, or Firm*—Finnegan, Henderson, Farabow, Garrett & Dunner, L.L.P.

[57] ABSTRACT

Apparatus for verifying, validating and codifying an inductive card having a plurality of individual credit cells, each of which represent a credit value until burned out so that a partially used card has valid and burned-out cells. The apparatus includes a card reader having a plurality of sensors corresponding to the plurality of credit cells on the inductive card, a device for comparing the distribution of burned-out cells on the card with a standardized order of burning out cells in using the card, and an indicating device for showing the quantity of credit values available on the card and whether or not the card is valid. The card reader has a matrix of sensors arranged in columns and rows, a set of column drivers, a set of row drivers, and is capable of detecting the condition of each credit cell on the card. The apparatus has an independent power supply and the comparing device has a microprocessor with a keyboard and a ROM memory.

5 Claims, 2 Drawing Sheets

INDEPENDENT DEVICE FOR VERIFYING, VALIDATING AND CODIFYING INDUCTIVE CARDS

This is a continuation of application Ser. No. 08/696,826, filed Aug. 21, 1996 now abandoned which is a 371 of PCT/BR9500022, filed Mar. 15, 1995.

The present invention concerns inductive debit cards, such as described in patent documents BR 9201380 and BR 9303503, among others, and, more specifically, to the verification of the number of credits available on said cards, as well as to the eventual recording of data on them, by means of selectively burning out individual cells.

The constant growth in use of public telephone sets operated by means of debit cards has resulted in the need to increase their availability to the user by expanding the number of sales outlets. As is happens with the token coins, such sales outlets include, besides telephone booths as telecommunication service stations, also shops, newspaper stands and the like.

It so happens that, due to the high value of the cards as compared to token coins, it becomes convenient to validate and verify the number of credits at the moment a user buys a card, be it for the reason of insuring that the card is not a frauded one or for the purpose of preventing possible user complaints and dishonest user abuses.

Such verification is not easy due to the fact that said cards do not have any visual indication of the quantity of valid credits still available.

The present invention aims to provide the means, independently of the publich telephone sets as well as of the telephone line, of supplying a visible indication of the existing credits on a card, be it a new card or a partially used one.

An additional aim of the invention consists on detecting cards having fraudulently restored cells.

The foregoing and other aims are met by the invention through the provisioning of a device provided with a read/record head similar to the one used in public telephone sets, having a power supply independent from the telecommunication network and provided with an alphanumeric display unit as well as a keyboard for operating commands.

According to another feature of the invention, said device comprises a read-only memory which stores the information regarding the burning-out order of the cells, said order being identical to the one used in the public telephone sets.

The invention will be better understood by the description of a preferred embodiment of the invention and the related figures, of which:

Figure 1:
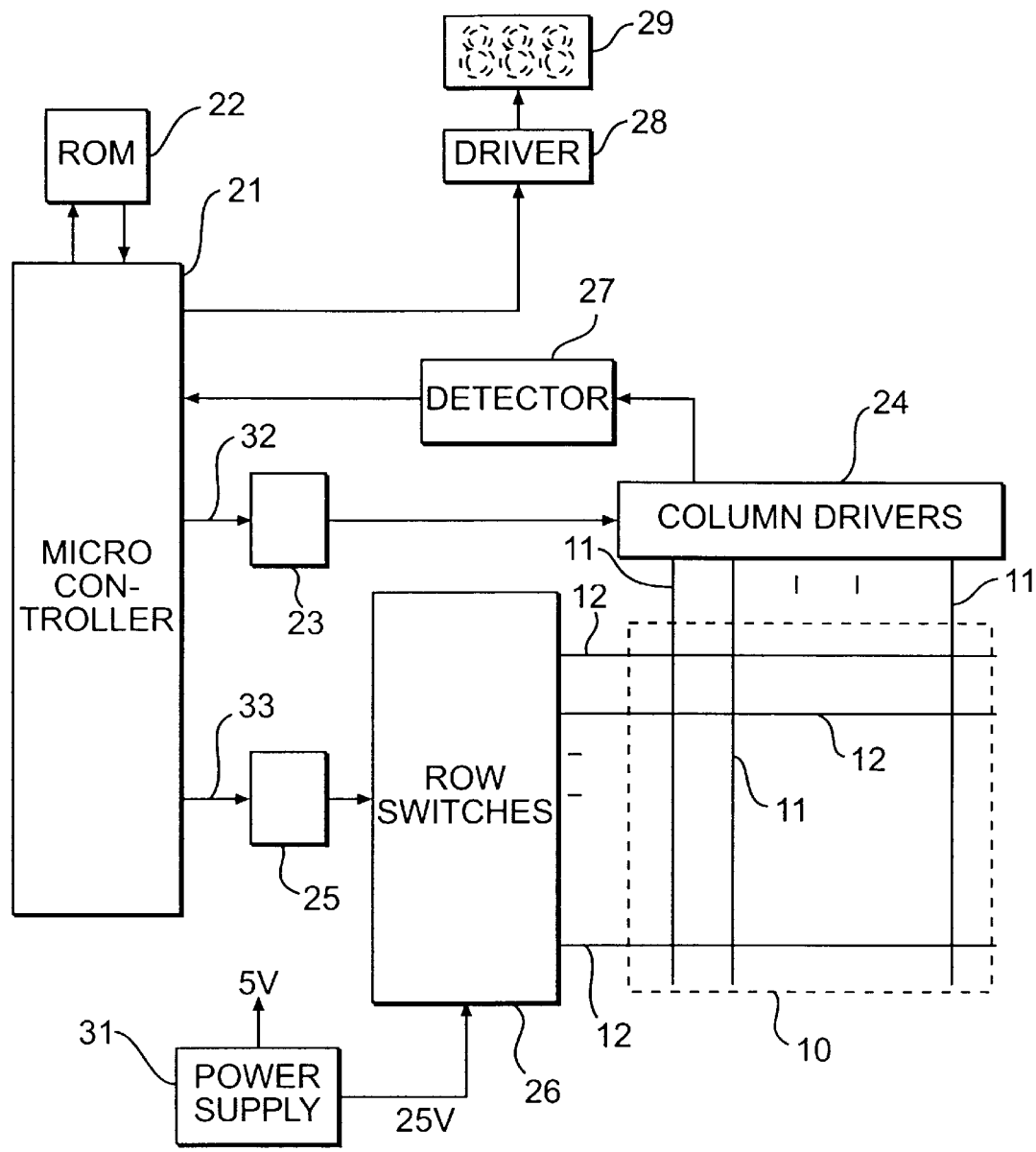
FIG. 1 shows the block diagram of a first embodiment, specifically intended to verify the validity and the quantity of credits available on a card.

According to FIG. 1, the hardware of said device comprises the read/write head 10, similar to the one described in patent documents BR 9204434 and BR 9300949, but not limited to these, whose sensing coils are connected at the crossings of column conductors 11 and row conductors 12 so as to form a matrix, switchable through of the selection of one row and one column, according to the teachings of patent documents BR 9203968, and BR 9302569.

The hardware operating control comprises microcontroller 21, operating in accordance with the program stored in ROM 22, allowing the verification of the card condition (not shown), when inserted in said red/write head 10, by sequencially and individually reading the card cell states. The selection of an individual cell is directed by the microcontroller which places the column address at output 32 and the row address at output 33. These addresses are demultiplexed by circuits 23 and 25, the former enabling one of the column drivers of driver set 24 and the latter completing the selection by driving one of the row switches of set 26, according to the operating principles described in patent document BR 9203968.

Once a cell is selected, the enabled oscillator applies an alternating current to the sensing coil, its amplitude being monitored by the detector 27 which tells if the cell is open (higher AC voltage) or short circuited (lower AC voltage).

When functioning as a verifier, the hardware will first check the validity and the correct positioning of the card, according to the principles described in patent document BR 9201380 and then work out a map of the valid and burnt-out cells, checking if these comply to the standard order of burning out cells stored in the memory, according to the teachings of patent documents BR 9304503 and BR 9400224. If the burning-out map agrees with said standard order, the card is considered valid and the microcontroller will count the total credits, sending this information to driver 28 which triggers display unit 29 showing the quantity of credits available on the card.

If, on the other hand, the card map does not match said burning out order stored in the memory, the micro-controller will consider the card as invalidated or frauded, issuing a code to the driver so as to show the corresponding message on the display unit, as for example, "ERR".

Figure 2:
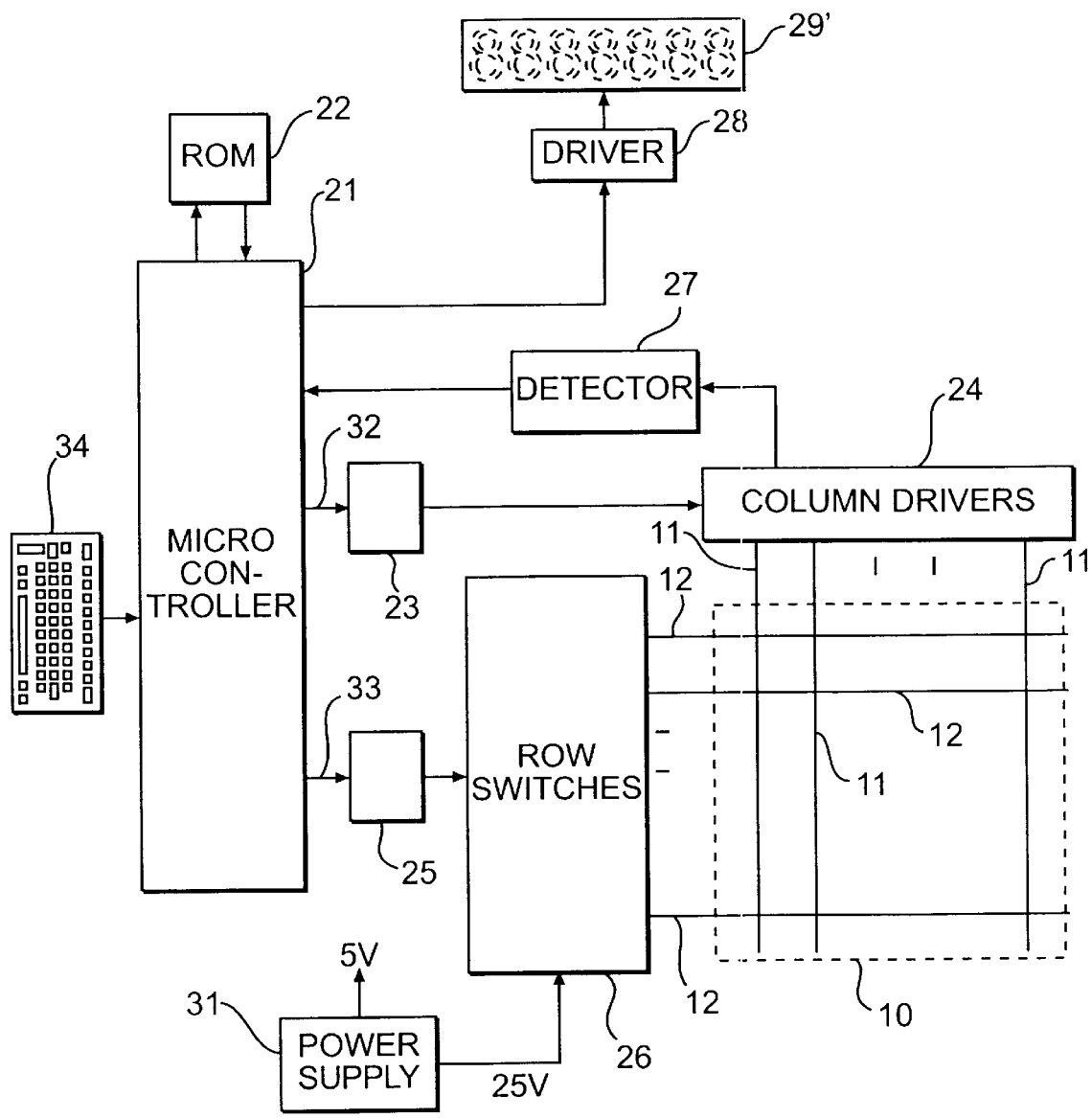
FIG. 2 shows the block diagram of a second embodiment of the invention where the previous circuit functions are complemented with the possibility of programming or validating cards.

FIG. 2 shows the hardware of the previous figure, adapted for additional functions, such as recording or validating cards. As shown, it is provided with a keyboard 34, connected to the microprocessor, as well as a display unit 29, having a larger capability than the one used in the basic circuit depicted in FIG. 1. This display unit shows the messages generated during the various steps of the validation operation which is effected through specific commands via the keyboard.

Said validation through hardware allows dispensing the detachable tabs at the side or corner of the card, such as described in patent application BR 9201380. According to said application, the card is manufactured having four indexing cells, located at the corners of the rectangular cell matrix, originally having one interrupted (open circuited) cell and three unbroken (short-circuited) ones. The user validates the card before inserting it, for the first time in the public telephone slot, by detaching said tab along the perforation provided on the card, interrupting the continuity of an indexing cell. The validated card has now two interrupted indexing cells and two unbroken ones. However, this perforation increases the cost of the manufacturing process, due to the high production volume of these cards.

The validation at the sales outlets by means of the hardware shown in FIG. 2, does away with the need of providing said perforation in the card, as the indexing cell may be burnt out through a command via the keyboard by applying a current having a suitable intensity and duration to the corresponding sensing coil so as to melt the metallic film making up the cell.

Since the energy supply of the equipment is independent of the telephone line, said device may even provide a visual validation indication by printing a visible mark on the card, or else, by perforating the card at a pre-determined place, as is done in some countries.

What is claimed is:

1. Apparatus for verifying, validating and codifying an inductive card having a plurality of individual credit cells each representing a credit value until burned out so that a partially used card has valid and burned-out cells, comprising:

a card reader having a plurality of sensors corresponding to the plurality of credit cells on the inductive card, means for comparing the distribution of burned-out cells on the card with a standardized order of burning out cells in using the card, to determine validity of the card, and indicating means for showing the quantity of credit values available on the card and whether or not the card is valid.

2. The apparatus of claim 1, wherein the card reader comprises a matrix of sensors arranged in columns and rows, a set of column drivers, a set of row drivers, and means for detecting the condition of each credit cell on the card.

3. The apparatus in claim 1, wherein said means for comparing comprises a microprocessor and a ROM memory.

4. The apparatus of any one of claims 1, 2, or 3, wherein the apparatus includes an independent power supply.

5. The apparatus of claim 3, wherein the apparatus includes a keyboard connected to the microprocessor.

* * * * *